Aug. 27, 1963    J. W. AGER, JR., ET AL    3,102,138
ORGANOBORON CARBOXYLIC ACID HALIDES AND THEIR PREPARATION
Filed Nov. 6, 1959
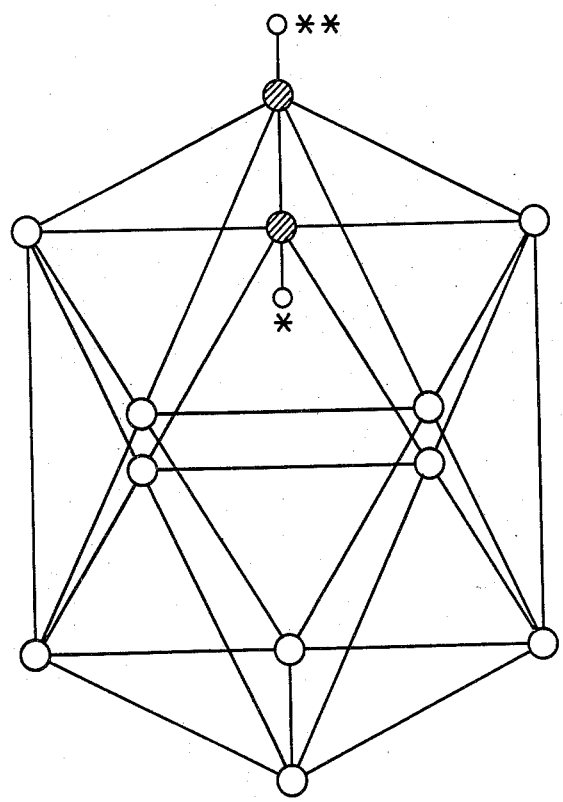
○  BORON
◐  CARBON
○  HYDROGEN ON CARBON
   (HYDROGEN ATOMS ON BORON
   OMITTED FOR CLARITY)
*INVENTORS*
JOHN W. AGER, JR.
JOYCE A. REID
BY
*Adams, Forward and McLean*
ATTORNEYS 3,102,138
ORGANOBORON CARBOXYLIC ACID HALIDES
AND THEIR PREPARATION
John W. Ager, Jr., Buffalo, and Joyce A. Reid, Tonawanda, N.Y., assignors to Olin Mathieson Chemical Corporation, a corporation of Virginia
Filed Nov. 6, 1959, Ser. No. 851,470
14 Claims. (Cl. 260—544)

This invention relates to organoboron carboxylic acid halides and to a method for their preparation. Organoboron monocarboxylic acid halides are prepared by the reaction of an inorganic acid halide with an organoboron monocarboxylic acid of the class $$RR'B_{10}H_8(CR''CR''')$$

wherein R and R' are each hydrogen or an alkyl group containing from 1 to 5 carbon atoms and wherein R'' and R''' are each a carboxyl radical, a carboxyalkyl radical, hydrogen, an alkyl group or an alkenyl group, the total number of carbon atoms in R'' and R''', taken together, not exceeding eight. Organoboron dicarboxylic acid halides are prepared by the reaction of an inorganic acid halide with an organoboron dicarboxylic acid of the class $RR'B_{10}H_8(CR^*CR^{**})$, wherein R and R' have the previous significance and wherein $R^*$ and $R^{**}$ are each a carboxyl radical or a carboxyalkyl radical, the total number of carbon atoms in $R^*$ and $R^{**}$ taken together being at least 4 and not more than 8. The reaction products prepared by the method of this invention are useful as fuels.

Organoboron carboxylic acids of the above classes suitable for use in this invention can be prepared, for example, according to the methods described in co-pending applications Serial No. 809,569, filed April 28, 1959, of John W. Ager, Jr., Roy P. Alexander and Theodore L. Heying, Serial No. 812,066, filed May 8, 1959, of John W. Ager, Jr., Roy P. Alexander and Theodore L. Heying, and Serial No. 851,472, filed of even date herewith of John W. Ager, Jr., et al.

The solid products prepared in accordance with the method of this invention, when incorporated with suitable oxidizers, such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention, it was discovered that organoboron monocarboxylic acids and organoboron dicarboxylic acids of the above classes can be reacted with an inorganic acid halide to give organoboron carboxylic acid halides.

Suitable inorganic acid halides include the halides and oxyhalides of phosphorus and sulfur such as phosphorous pentachloride, phosphorous trichloride, phosphorous oxychloride, thionyl chloride, sulfuryl chloride, sulfur chloride, phosphorous tribromide, phosphorus pentabromide, and phosphorous triiodide.

Solvents which are inert with respect to the reactants can be employed. For example, where the inorganic acid halide is phosphorus pentachloride or phosphorus trichloride, phosphorus oxychloride can be employed as a mutual inert solvent.

It is frequently unnecessary to employ a solvent, however, since the inorganic acid halide is either a liquid, as for example, phosphorous trichloride, or a liquid is formed during the reaction, as for example, the formation of phosphorous oxychloride when the inorganic acid halide employed is phosphorous pentachloride.

The ratio of reactants can vary considerably, although the amount of inorganic acid halide employed is preferably in excess of 1 mole per mole of organoboron monocarboxylic acid or 2 moles per mole of organoboron dicarboxylic acid to be halogenated. Where the inorganic acid halide is a liquid, large excesses can be employed. The temperature for the reaction of the organoboron compound with the inorganic acid halide is generally maintained between 0° and 150° C. and preferably between 25° and 100° C. Higher temperatures are to be avoided when starting with organoboron dicarboxylic acids of the above type in which $R^*$ and $R^{**}$ contain a total of 4 or 5 carbon atoms, since under more extreme conditions, these compounds tend to form organoboron cyclic ketones as described in co-pending application Serial No. 851,474, filed of even date herewith of Roy P. Alexander et al.

The process of the present invention is illustrated in detail by the following examples. In the examples, the term "moles" signifies gram moles.

*Example I*

A small flask was equipped with a magnetic stirring bar and a condenser closed with a calcium chloride tube. 5.2 g. (0.02 mole) of $B_{10}H_{10}[C(CH_2COOH)]_2$ were placed in the flask, 8.32 g. (0.04 mole) of phosphorous pentachloride were added and the solids were mixed. The mixture was heated at 90 to 110° C. for 17 hours. The phosphorous oxychloride formed was removed by distillation at reduced pressure. The remaining product, a brown liquid, was extracted several times with a total of 200 ml. of n-pentane in a dry box. The pentane solution was filtered and dried over magnesium sulfate. The pentane solution, upon cooling, yielded a light tan solid which was removed by filtration.

*Example II*

10.4 g. of $B_{10}H_{10}[C(CH_2COOH)]_2$ and 16.4 g. of phosphorous pentachloride were mixed and heated at 60 to 80° C. for 40 hours. The phosphorous oxychloride was removed, and the product was extracted with n-pentane and crystallized upon cooling as in Example I. A small amount of the product was recrystallized from pentane and found by analysis to contain 25.7 percent carbon, 5.22 percent hydrogen and 23.9 percent chlorine which indicated that it was $B_{10}H_{10}[C(CH_2COCl)]_2$ which theoretically contains 24.2 percent carbon, 4.72 percent hydrogen and 23.9 percent chlorine.

*Example III*

1 g. of $B_{10}H_{10}[C(H)C(COOH)]$ was placed in a small flask. 0.8 g. of phosphorous pentachloride was added and the solids were mixed. Within 5 minutes, the mixture was liquid and was foaming. The mixture was heated at 100 to 120° C. for 68 hours. The phosphorous oxychloride was removed and a liquid was collected at 48° C. and 0.3 mm. Hg pressure absolute which solidified upon standing. Mass spectrometric analysis of the material indicated primarily $B_{10}H_{10}[C(H)C(COCl)]$ with minor amounts of $B_{10}H_{10}[C(H)C(Cl)]$ and $$B_{10}H_{10}[C(H)C(CH_2Cl)]$$

*Example IV*

A small flask (approximately 15 ml.) was equipped with a condenser closed with a calcium chloride tube.

1.38 g. of $B_{10}H_{10}[C(H)C(COOH)]$ and 1 g. of phosphorous pentachloride were mixed in the flask. Almost immediately foaming began and the mixture became liquid. The mixture was heated at 110 to 120° C. for 20 hours. The condenser was replaced with a distillation head. The phosphorous oxychloride was removed first and then 1.37 g. of liquid was distilled at 52 to 53° C. at a pressure of 0.5 mm. Hg absolute. The product, identified as $B_{10}H_{10}[C(H)C(COCl)]$ by infrared analysis and boiling point (compared with the product from Example III), solidified when cooled in cold water.

*Example V*

A mixture of 14 g. (0.061 mole) of

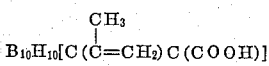

and 14 g. (0.067 mole) of phosphorous pentachloride was heated at 90° to 100° C. for three hours in a 125 ml. flask. HCl evolved. The phosphorous oxychloride formed in the reaction was distilled from the reaction mixture under reduced pressure (water pump) and the residue was dissolved in n-pentane and filtered. The pentane was distilled leaving 15 g. of a colorless semi-solid which became more solid on standing. The material retained a waxlike consistency. Mass spectrometric analysis showed it to be pure

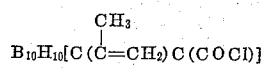

a 79 percent yield.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula $B_{10}H_{10}[C(CH_2COCl)]_2$ prepared as described in Examples I and II has the same structural formula as that shown in the accompanying drawing with the exception that the hydrogen atoms indicated by the single and double asterisk are replaced by the radical —$CH_2COCl$ The compound of the formula $B_{10}H_{10}[C(H)C(COCl)]$ prepared as described in Examples III and IV has the same structural formula as that shown in the accompanying drawing with the exception that the hydrogen atom indicated by the double asterisk is replaced by the radical —COCl.

The compound of the formula

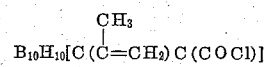

prepared as described in Example III has the same structural formula as that shown in the accompanying drawing with the exception that the hydrogen atom indicated by the single asterisk is replaced by the radical

and the hydrogen atom indicated by the double asterisk is replaced by the radical —COCl.

Reference is made to Chemistry of the Hydrides, by Dallas T. Hurd, 1952, for a structural representation of the elementary decaborane molecule. The compounds of the instant invention may be considered as structural derivatives of decaborane, but include in addition atoms of carbon, oxygen, and halogen.

We claim:

1. Organoboron carboxylic acid halides having a structural formula of the type shown in the accompanying drawing selected from the class consisting of organoboron monocarboxylic acid halides and organoboron dicarboxylic acid halides, the organoboron monocarboxylic acid halides being of the class $RR'B_{10}H_8(CR''CR''')$ wherein R and R' are each selected from the class consisting of hydrogen and an alkyl radical containing 1 to 5 carbon atoms and wherein R'' and R''' are each selected from the class consisting of hydrogen, an alkyl radical, a monoalkenyl hydrocarbon radical, —COX and —$R_1$COX wherein $R_1$ is a bivalent saturated hydrocarbon radical containing 1 to 7 carbon atoms and X is halogen, the total number of carbon atoms in R'' and R''', taken together, not exceeding eight, and the organoboron dicarboxylic acid halides being of the class $RR'B_{10}H_8R^*R^{**}$ wherein R and R' have their previous significance and wherein R* and R** are each selected from the group consisting of —COX and —$R_2$COX wherein $R_2$ is a bivalent saturated hydrocarbon radical, the total number of carbon atoms in R* and R**, taken together, being at least 4 and not more than 8.

2. $B_{10}H_{10}[C(H)C(COCl)]$ having a structural formula of the type shown in the accompanying drawing.

3. $B_{10}H_{10}[C(CH_2COCl)]_2$ having a structural formula of the type shown in the accompanying drawing.

4.

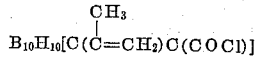

having a structural formula of the type shown in the accompanying drawing.

5. A method for the production of an organoboron carboxylic acid halide having a structural formula of the type shown in the accompanying drawing which comprises reacting an inorganic acid halide with an organoboron compound selected from the class consisting of organoboron monocarboxylic acids and organoboron dicarboxylic acids, the organoboron monocarboxylic acids being of the class $RR'B_{10}H_8(CR''CR''')$ wherein R and R' are each selected from the class consisting of hydrogen and an alkyl radical containing 1 to 5 carbon atoms and wherein R'' and R''' are each selected from the class consisting of hydrogen, an alkyl radical, a monoalkenyl hydrocarbon radical, a carboxyl radical and a carboxyalkyl radical, the total number of carbon atoms in R'' and R''', taken together, not exceeding eight, and the organoboron dicarboxylic acids being of the class $$RR'B_{10}H_8(CR^*CR^{**})$$

wherein R and R' have their previous significance and wherein R* and R** are each selected from the group consisting of a carboxyl radical and a carboxylalkyl radical, the total number of carbon atoms in R* and R**, taken together, being at least 4 and not more than 8.

6. The method of claim 5 wherein the inorganic acid halide is phosphorous pentachloride.

7. The method of claim 5 wherein the organoboron compound is an organoboron monocarboxylic acid.

8. The method of claim 5 wherein the organoboron compound is an organoboron dicarboxylic acid.

9. The method of claim 7 wherein the organoboron monocarboxylic acid is $B_{10}H_{10}[C(H)C(COOH)]$.

10. The method of claim 7 wherein the organoboron monocarboxylic acid is $$B_{10}H_{10}[C(\overset{CH_3}{\underset{|}{C}}=CH_2)C(COOH)]$$

11. The method of claim 8 wherein the organoboron dicarboxylic acid is $B_{10}H_{10}[C(CH_2COOH)]_2$.

12. The method of claim 7 wherein the inorganic acid halide is phosphorus pentachloride and the organoboron monocarboxylic acid is $B_{10}H_{10}[C(H)C(COOH)]$.

13. The method of claim 7 wherein the inorganic acid halide is phosphorus pentachloride and the organoboron monocarboxylic acid is $$B_{10}H_{10}[C(\overset{CH_3}{\underset{|}{C}}=CH_2)C(COOH)]$$

14. The method of claim 8 wherein the inorganic acid halide is phosphorus pentachloride and the organoboron dicarboxylic acid is $B_{10}H_{10}[C(CH_2COOH)]_2$.

No references cited.